(12) United States Patent
Nelson et al.

(10) Patent No.: US 6,194,097 B1
(45) Date of Patent: Feb. 27, 2001

(54) BATTERY COMPARTMENT CAP HAVING AN IMPROVED CONTACT

(75) Inventors: John Carl Nelson, Salem; Gary Morgan Vance, Roanoke, both of VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 662 days.

(21) Appl. No.: 08/546,298

(22) Filed: Oct. 20, 1995

(51) Int. Cl.[7] .................................................. H01M 2/26
(52) U.S. Cl. ............................................ 429/121; 429/123
(58) Field of Search .................................. 429/121, 123, 429/96–100; 2/6.3, 426–454

(56) References Cited

U.S. PATENT DOCUMENTS

| | | | |
|---|---|---|---|
| 1,215,757 | * 2/1917 | White | 362/196 |
| 1,286,800 | * 12/1918 | Schulte | 439/500 |
| 5,108,847 | * 4/1992 | Edwards et al. | 429/7 |
| 5,186,665 | * 2/1993 | Kelly et al. | 439/862 |

* cited by examiner

*Primary Examiner*—Carol Chaney
(74) *Attorney, Agent, or Firm*—Arthur L. Plevy; Buchanan Ingersoll PC

(57) ABSTRACT

A removable cap for an associated battery compartment housing at least one battery, whereby battery compartment forms a portion of a night vision device which is powered by the battery. The cap includes a one-piece contact that can be attached to the cap in a single operation. The contact includes a unitarily formed leaf-spring which makes mechanical and electrical contact with the battery when the cap is installed on the battery compartment.

16 Claims, 2 Drawing Sheets

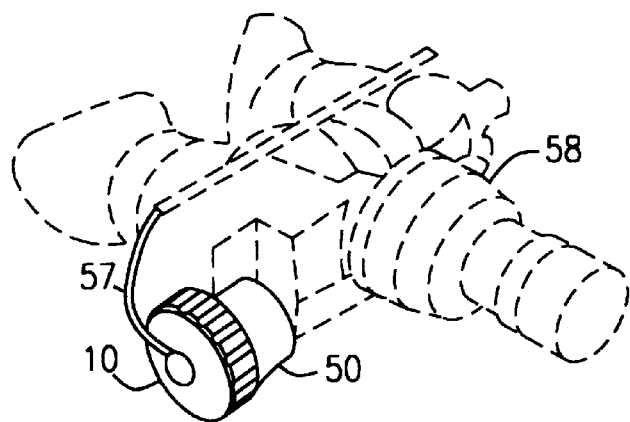
FIG. 1A
(PRIOR ART)
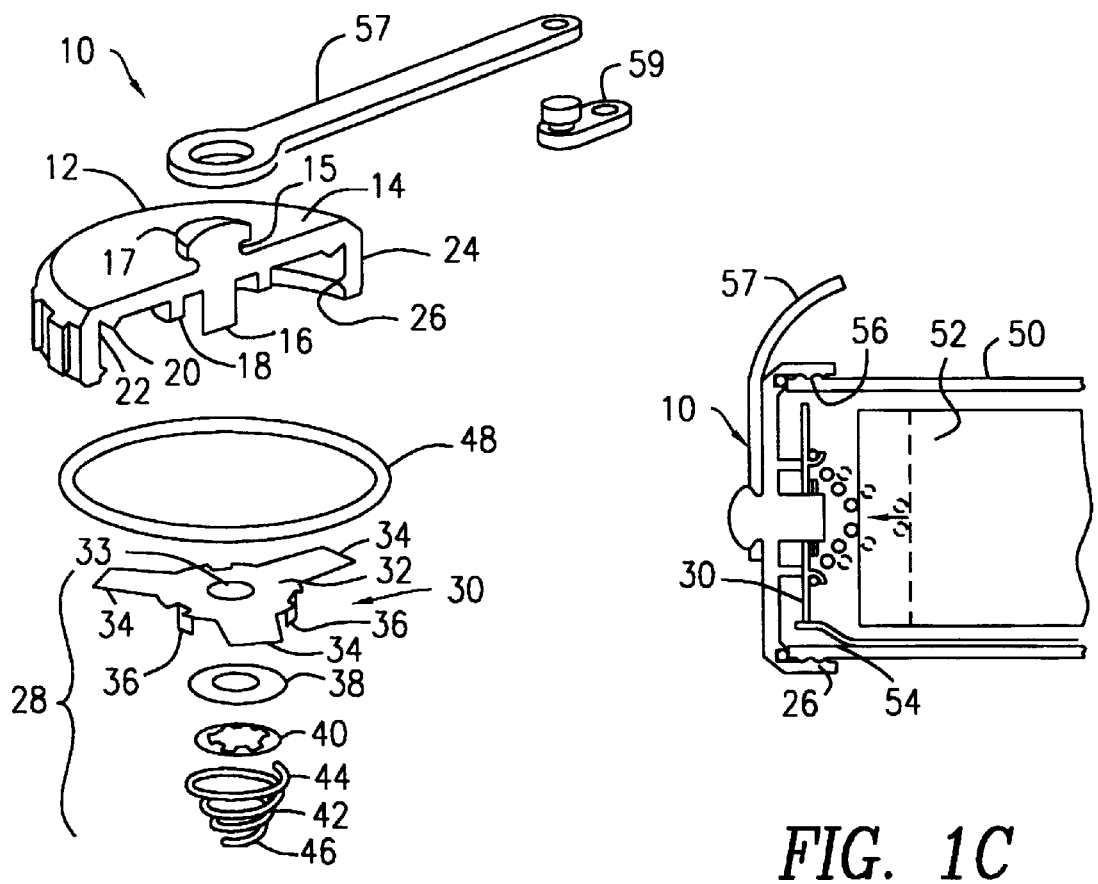
FIG. 1B
(PRIOR ART)
FIG. 1C
(PRIOR ART)

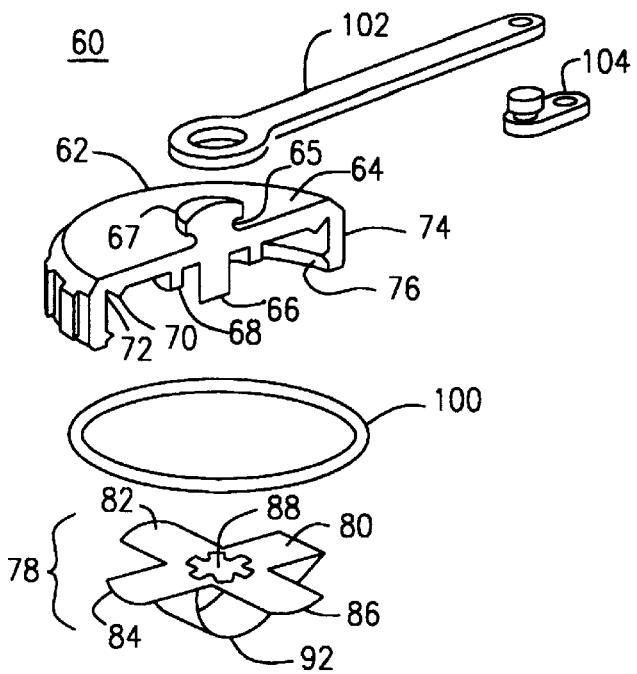
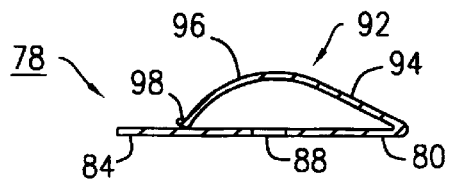
FIG. 2A
FIG. 2C
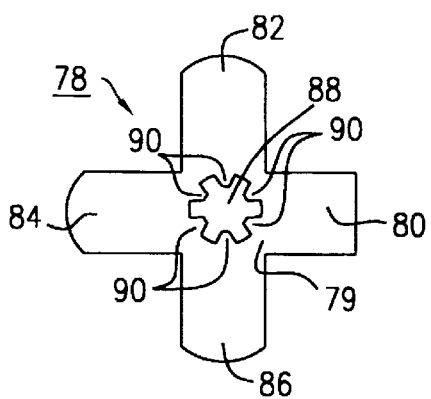
FIG. 2B
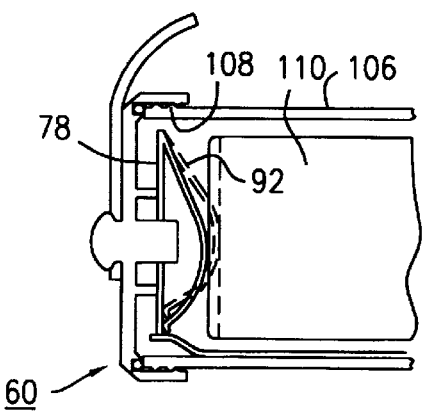
FIG. 2D

BATTERY COMPARTMENT CAP HAVING AN IMPROVED CONTACT

FIELD OF THE INVENTION

The present invention relates generally to battery compartment caps and more specifically to a removable battery compartment cap having a one piece contact assembly.

BACKGROUND OF THE INVENTION

Battery compartments for housing batteries used in powering various electronic devices such as night vision goggles, flash lights, camera light meters, etc., are well known in the art. Such battery compartment designs include removable battery compartment caps which enable the battery or batteries contained within the compartment to be removed and replaced with a new or recharged battery or batteries.

Referring to FIG. 1A, there is shown a AN/PVS-7B night vision goggle device 58 (illustrated by the dotted lines) which includes a horizontally oriented PVS-7B battery compartment 50 closed by a removable prior art PVS-7B battery compartment cap 10. The battery compartment cap is tethered to the night vision goggle device by a retainer strap 57. As can be seen in FIG. 1C, the battery compartment 50 is loaded with either Lithium Sulfur Dioxide BA-5567/u batteries 52 (only one is shown) or two (2) AA batteries.

FIG. 1B is an exploded perspective view of the removable battery compartment cap 10 of FIG. 1A. As shown, the battery compartment cap 10 generally comprises a cap member 12, the retainer strap 57, a retainer link 59, an o-ring 48 and a contact assembly 28. The cap member 12 includes a circular top 14 and an annular skirt 24 depending from the periphery of the circular top 14. The compartment side surface of the circular top 14 includes a centrally disposed contact locating post 16 surrounded by an annular contact seating flange 18 and a circumferential lip 20. The circumferential lip 20 in conjunction with the annular skirt 24 define a groove 22 for receiving the o-ring 48 that seals the battery compartment cap 10 to the battery compartment 50. The exterior surface of the circular top 14 defines a centrally disposed projection 15 with an enlarged end 17 for coupling the battery compartment cap 10 to the retaining strap 57. The retaining strap 57 is coupled to the night vision goggle device 58 by a retainer link 59. A thread arrangement 26 for securing the battery compartment cap 10 to the battery compartment 50 is provided on the inner surface of the annular skirt 24.

Still referring to FIG. 1B, the contact assembly 28 includes a stamped metal contact 30, a washer 38, a circular retaining clip 40 and a conical-shaped coil spring 42. The contact includes a hub 32 portion with a centrally disposed aperture 33. Three spoke members 34 extend radially from the periphery of the hub portion 32. In between any two of the three spoke members is a tab 36. Each tab 36 extends axially in the direction of the spring 42 from the periphery of the hub portion 32. The circular retaining clip 40 that retains the contact 30 to the contact locating post 16 includes sharp projections 41 which cut into the locating post 16. The coil spring 42 includes a large diameter end 44 and a small diameter end 46.

Each component of the contact assembly 28 must be separately assembled to the cap member 12 as follows. First, the contact 30 of the contact assembly 28 is assembled to the cap member 12 so that the hub 32 portion engages the annular seating flange 18 while the contact locating post 16 extends through the aperture 33 of the hub portion 32. Next, the washer 24 is installed onto the contact locating post 16 so that it rests against the hub portion 32 of the contact 30. The retaining clip 40 is then press-fitted to the contact locating post 16. Additional retention is sometimes provided by heat staking the free end of the contact locating post 16 after the retaining clip 40 is press fitted thereto. Finally, the coil spring 42 is non-removably secured to the contact 30 by the three tabs 36. This is accomplished by bending each tab 36 around a portion of the first coil of the large diameter end 44 of the coil spring 42 to mechanically secure the coil spring 42 to the contact 30. Then, each tab 36 is soldered to the coil to ensure electrical continuity between the coil spring 42 and the contact 30.

A completed electrical circuit is provided when the battery compartment cap 10 is installed on the battery compartment 50 loaded with batteries 52 as shown in FIG. 1C. The electrical circuit is created by the mechanical and electrical contact between the small diameter portion 46 of the coil spring and the negative end of the battery 52, and the solder connections between the coil spring 42 and the contact 30. The circuit is completed by the physical touching of the contact 30 to a ground sleeve 54 in the battery compartment 50.

Although the battery compartment cap 10 of FIGS. 1A–1C operates in a generally satisfactory manner, there exists certain disadvantages which reduces its utility. One disadvantage is that the contact assembly 28 is comprised of four (4) separate components which must be assembled in a process which involves three bending operations and three soldering operations which add complexity to the manufacturing of the battery compartment cap 10. Another problem with the battery compartment cap 10 is that it presents difficulties when the batteries 52 are changed. More particularly, when the battery compartment cap 10 is applied to the battery compartment, the relatively long free length of the uncompressed coil spring 42 (represented in FIG. 1C as dotted lines) causes it to contact the battery 52 before the thread 26 of the battery compartment cap 10 engages the thread 56 of the battery compartment 50, thereby requiring a significant compression force to apply the battery compartment cap 10. This causes difficulty when changing batteries, especially under adverse circumstances. Still another problem with the above design concerns the possibility of missed contact when loading certain types of batteries. In particular, certain types of batteries have diameters which are significantly small than the diameter of the battery compartment. If such batteries are loaded into the battery compartment when the battery compartment is oriented horizontally, the batteries tend to sit in an off-centered manner within the battery compartment. Consequently, when the battery compartment cap is applied to the battery compartment the small diameter end of the spring may not contact the batteries.

It is, therefore, a primary object of the present invention to provide an improved battery compartment cap with a one-piece contact assembly that substantially overcomes the disadvantages associated with prior art battery compartment caps.

SUMMARY OF THE INVENTION

A removable cap for closing an associated battery compartment housing at least one battery. The cap comprises a cap member and contact means attached to the cap member for completing an electrical circuit with the at least one battery housed within the battery compartment. The contact means includes a unitarily formed sliding biasing member for making mechanical and electrical contact with the at least one battery.

BRIEF DESCRIPTION OF THE DRAWINGS

For a detailed understanding of the present invention, reference should be made to the following detailed description taken in conjunction with the accompanying drawings wherein:

FIG. 1A is a perspective view of an exemplary night vision device shown by dotted lines. The night vision device is powered by batteries housed in a battery compartment which includes a prior art battery compartment cap;

FIG. 1B is an exploded partial cross-sectional view of the prior art battery compartment cap of FIG. 1A;

FIG. 1C is a cross-sectional view through the prior art battery compartment cap and battery compartment of FIG. 1A;

FIG. 2A is an exploded partial cross-sectional view of an exemplary embodiment of the battery compartment cap of present invention;

FIG. 2B is a bottom plan view of the contact assembly used in the battery compartment cap of the present invention;

FIG. 2C is side cross-sectional view through the contact assembly of FIG. 2B; and FIG. 2D is a cross-sectional view through the battery compartment cap of the present invention installed on a battery compartment.

DETAILED DESCRIPTION OF THE INVENTION

Referring to FIG. 2A, there is shown an exploded perspective view of an exemplary embodiment of a removable battery compartment cap made according to the present invention denoted by the numeral 60. As shown, the battery compartment cap 60 generally comprises a cap member 62, a retainer strap 102, a retainer link 104, an o-ring 100 and a one piece contact assembly 78. The components of the battery compartment cap 60 can be manufactured from any well known conventional materials. For instance, the cap member 62, the retainer strap 102, and retainer link 104 can be manufactured from any suitable plastic or metal material. The o-ring 100 can be manufactured from any elastic material such as rubber. The contact assembly 78 can be manufactured from any suitable metal such as beryllium copper or stainless steel.

As can be seen in FIG. 2A, the structure of the cap member 62 employed in the battery compartment cap 60 of the present invention is similar to the prior art cap member of FIGS. 1A–1C, and thus, includes a circular top 64 and an annular skirt 74 depending from the periphery of the circular top 64. The compartment side of the circular top 64 includes a centrally disposed contact locating post 66 surrounded by an annular contact seating flange 68 and a circumferential lip 70. The circumferential lip 70 in conjunction with the annular skirt operate to define a groove 72 for receiving the o-ring 100 that seals the battery compartment cap 60 to an associated battery compartment 106 (FIG. 2D). It should be understood, however, that any other technique for sealing the battery compartment cap 60 to the battery compartment can be used. For example, if the cap member is manufactured from a plastic material, the o-ring 100 can be replaced with one or more a unitarily formed sealing ribs to further reduce the assembly costs of the battery compartment cap.

Referring still to FIG. 2A, the exterior of the circular top 64 defines a centrally disposed protection 65 having an enlarged end 67 for coupling the battery compartment cap 60 to one end of the retaining strap 102. The other end of the retaining strap 102 is coupled to a retainer link 104 which attaches the battery compartment cap 60 to a night vision goggle device similar to the one shown in FIG. 1A. The retaining strap and link cooperate to tether the battery compartment cap to the night vision goggle device when the battery compartment cap is removed from the battery compartment.

Still referring to FIG. 2A, a thread arrangement 76 is provided on the inner surface of the annular skirt 74. The thread 76 coacts with a corresponding thread 108 on the battery compartment 106 (see FIG. 2D) to removably secure the battery compartment cap 60 thereto.

Referring now to FIG. 2B, the contact assembly 78 preferably comprises an x-shaped one-piece stamped and formed metal contact 79 having a centrally disposed aperture 88 and a low profile leaf-spring 92 having a flat portion 94 and an arcuate portion 96. The one piece contact assembly 78 eliminates the separate spring, washer and circular clip components and the six tab bending/soldering operations which are associated with the prior art battery compartment cap of FIGS. 1A–1C. The x-shaped of the contact 79 is made up of four extensions 80, 82, 84, and 86 which are symmetrically positioned at approximately 90° increments around the centrally disposed aperture 88. The extensions 82 and 86 operate to laterally stabilize the contact assembly 78. In another embodiment of the present invention, the extensions 82 and 86 can be eliminated altogether if desired to reduce the complexity of the stamping die that is used in forming the contact assembly.

As shown in FIG. 2C, one end of the leaf-spring 92 is unitarily formed with extension 80. The flat portion 94 of the spring 92 projects away from the extension 80 at a preferred angle of approximately 33° and then merges with the arcuate portion 96. The arcuate portion 96 curves back toward the extension 84 where it terminates in a lip or bend 98 that enables the free end of the spring 92 to slide along the surface of extension 84. The broad and planar surface area of the leaf-spring 92 provides more than twice the contact area when compared to the prior art coil spring described earlier in the background of the invention. Accordingly, the problem of missed contact with the batteries as described earlier with regard to the prior art battery compartment cap is substantially reduced. Moreover, the leaf-spring 92 has a significantly lower uncompressed profile as shown with dotted lines in FIG. 2D, when compared with the uncompressed profile of the prior art spring of FIGS. 1A–1C. This allows the thread 76 of the battery compartment cap 60 to engage the thread 108 of the battery compartment 106 prior to the spring 92 engaging the battery 110. This makes changing the batteries substantially easier when compared with the prior art battery compartment cap of FIGS. 1A–1C, especially during adverse conditions which often require one-handed battery changes.

Referring again to FIG. 2B, the aperture 88 includes a plurality of unitarily formed locking projections 90 which extend radially inward from the periphery of the aperture 88 and operate to cut into the contact locating post 66 to lock and retain the contact assembly 78 to the cap member 60 when the cap member is assembled 60. The unitarily formed locking protections 90 and the unitarily formed spring 92 of the contact assembly 78 enables it to be assembled to the cap member 62 in a single operation which substantially reduces the cost of manufacturing the battery compartment cap 60 when compared with the prior art cap of FIGS. 1A–1C.

Although the battery compartment cap 60 of the present invention is especially suited for use with the battery compartment of a AN/PVS-7B night vision goggle device as shown in FIG. 1A, it can be easily adapted to fit in many other applications.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. A removable cap for closing a battery compartment housing at least one battery, said cap comprising:

a cap member; and contact means attached to said cap member for completing an electrical circuit with the at least one battery housed within the battery compartment, said contact means having a planar base member for attaching said contact means to said cap member and a biasing member having a first end that is unitary with said base member and a second end that contacts and is slidable along a surface of said base member when said biasing member is compressed against an end of the at least one battery when said cap is installed on the battery compartment.

2. The removable cap according to claim 1, further comprising sealing means associated with said cap member for providing a substantially water-tight seal between the cap member and the battery compartment when said cap is installed on the battery compartment.

3. The removable cap according to claim 1, further comprising means for tethering said cap to the battery compartment.

4. The removable cap according to claim 1, wherein said cap member includes locating means for attaching said contact means to said cap member.

5. The removable cap according to claim 4, wherein said contact means includes unitarily formed locking means for retaining said contact means to said locating means.

6. The removable cap according to claim 1, wherein said biasing member comprises a leaf-spring.

7. A removable cap in combination with a battery compartment housing at least one battery, said battery compartment forming a portion of a night vision device which is powered by said at least one battery, comprising:

contact means attached to said cap member for completing an electrical circuit with the at least one battery housed within the battery compartment, said contact means having a planar base member for attaching said contact means to said cap member and a biasing member having a first end that is unitary with said base member and a second end that contacts and is slidable along a surface of said base member when said biasing member is compressed against an end of the at least one battery when said cap is installed on the battery compartment.

8. The cap and battery compartment according to claim 7, further comprising sealing means associated with said cap for providing a substantially water-tight seal between said cap and said battery compartment when said cap is installed on said battery compartment.

9. The cap and battery compartment according to claim 7, further comprising means for tethering said cap to said battery compartment.

10. The cap and battery compartment according to claim 7, wherein said cap includes locating means for attaching said contact means to said cap.

11. The cap and battery compartment according to claim 10, wherein said contact means includes unitarily formed locking means for retaining said contact means to said locating means.

12. The cap and battery compartment according to claim 7, wherein said sliding biasing member comprises a leaf-spring.

13. The cap and battery compartment according to claim 7, wherein said cap and said battery compartment each include thread means for removably retaining said cap to said battery compartment, said biasing member having an uncompressed profile which enables said thread means of said cap and said battery compartment to engage before said biasing member engages said at least one battery housed in said battery compartment.

14. The cap and battery compartment according to claim 7, wherein said night vision device is an AN/PVS-7B.

15. The cap and battery compartment according to claim 7, wherein said battery compartment is a PVS-7B.

16. A removable cap for use with a battery compartment housing at least one battery, said battery compartment forming a portion of a AN/PVS-7B night vision device which is powered by said at least one battery, comprising:

a one-piece contact assembly attached to said cap for completing an electrical circuit with the at least one battery housed within the battery compartment, said contact assembly having a planar base member for attaching said contact means to said cap member and a biasing member having a first end that is unitary with said base member and a second end that contacts and is slidable along a surface of said base member when said biasing member is compressed against an end of the at least one battery when said cap is installed on the battery compartment, said biasing member having an uncompressed profile which enables said cap to engage the battery compartment during the installation thereof before said biasing member engages the at least one battery housed in the battery compartment.

\* \* \* \* \*